United States Patent [19]
Kim

[11] Patent Number: 5,943,109
[45] Date of Patent: Aug. 24, 1999

[54] LIQUID CRYSTAL DISPLAY DEVICE FORMED WITH A HOLOGRAM LAYER HAVING A PLURALITY OF PATTERNS

[75] Inventor: Si-hwan Kim, Seoul, Rep. of Korea

[73] Assignee: Samsung Display Devices Co., Ltd., Kyungki-do, Rep. of Korea

[21] Appl. No.: 09/047,514

[22] Filed: Mar. 25, 1998

[30] Foreign Application Priority Data

Jul. 25, 1997 [KR] Rep. of Korea ............... 97-35203

[51] Int. Cl.⁶ ..................................... G02F 1/1335
[52] U.S. Cl. ..................................... 349/113
[58] Field of Search ..................................... 349/113

[56] References Cited

U.S. PATENT DOCUMENTS

| | | | |
|---|---|---|---|
| 5,594,560 | 1/1997 | Jelley et al. | 359/15 |
| 5,659,408 | 8/1997 | Wenyon | 359/15 |
| 5,663,816 | 9/1997 | Chen et al. | 359/15 |

*Primary Examiner*—William L. Sikes
*Assistant Examiner*—Robert J. Hollingshead
*Attorney, Agent, or Firm*—Lowe Hauptman Gopstein Gilman & Berner

[57] ABSTRACT

A liquid crystal display device includes a hologram layer having predetermined patterns corresponding to patterns of a color filter. Light inputted to the LCD device is transmitted through the hologram layer when reflected by a reflection layer out of the LCD device. Efficiency of use of the light reflected from the hologram layer is maximized so that quality of an image is improved.

6 Claims, 5 Drawing Sheets

LIQUID CRYSTAL DISPLAY DEVICE FORMED WITH A HOLOGRAM LAYER HAVING A PLURALITY OF PATTERNS

BACKGROUND OF THE INVENTION

1. Field of the Invention

The present invention relates to a liquid crystal display (LCD) device, and more particularly, to a reflection type LCD device in which light efficiency reflection is improved by a hologram layer.

2. Description of the Related Art

LCD devices have advantages in terms of low power consumption due to a low driving voltage and a simplified structure. Most LCD devices which are currently being used adopt a TN (twisted nematic) type liquid crystal or an STN (super twisted nematic) type liquid crystal. Accordingly, at least one polarizer is necessary provided in order to control light, with, a filter is to realize full color image. A reflection layer is further provided for a reflection type LCD device.

FIG. 1 is a sectional view illustrating a general reflection type LCD device having the color filter and the reflection layer.

Referring to the drawing, the reflection type color LCD device is comprised of an upper substrate 12 and a lower substrate 26, an upper polarizer 10 disposed on the upper substrate 12, a lower polarizer 28 which can be selectively disposed below the lower substrate 26, and a reflection layer 30 disposed below the lower polarizer 28. A color filer 14 is arranged to be below the upper substrate 12. A plurality of upper electrodes 16 are formed in strips below the color filer 14 and a plurality of lower electrodes 24 are formed in strips on the lower substrate 26. The upper and lower electrodes 16 and 24 are arranged to cross with one another and covered with upper and lower orientation films 18 and 22, respectively. An LCD layer 20 is formed between the upper and lower orientation films 18 and 22.

In the above-mentioned reflection type color LCD device, input light is partially blocked by the color filter and the upper and lower polarizers 10 and 28 disposed midway in an optical path of the light. In particular, since over 50% of the light inputted to the LCD device is blocked by the polarizers, the amount of light which can be reflected by the reflection layer 30 is reduced. Therefore, to improve brightness of an image in the reflection type LCD device, the efficiency of light use should be increased.

SUMMARY OF THE INVENTION

To solve the above problem, it is an objective of the present invention to provide a reflection type color LCD device having a hologram layer so that image brightness is improved.

Accordingly, to achieve the above objective, there is provided an LCD device comprising: a pair of substrates, disposed from each other with a predetermined distance, and having an electrode or a thin film transistor driving device on the opposite sides thereof. An orientation film is formed on each opposing surface of the substrates, a liquid crystal layer is formed between the orientation films. A reflection layer disposed at one side of one of the substrates to reflect the light transmitted through the liquid crystal is toward the outside thereof. A hologram layer having predetermined patterns and light transmissivity which differs according to each of the patterns is provided so that efficiency of use of the light reflected by the reflection layer can be maximized.

It is preferable in the present invention that the LCD device further comprise a polarizer disposed at one side of any one of the substrates to control light inputted to the liquid crystal layer, and a color filter disposed at one side of any one of the substrates to selectively transmit the light passed through the liquid crystal layer.

It is also preferable in the present invention that the hologram layer be formed on between the electrode and the orientation film formed one of the substrates, and that the reflection layer be formed between the electrode and the hologram layer formed on one of the substrates and have the same pattern as that of the electrode.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE INVENTION

Figure 1:
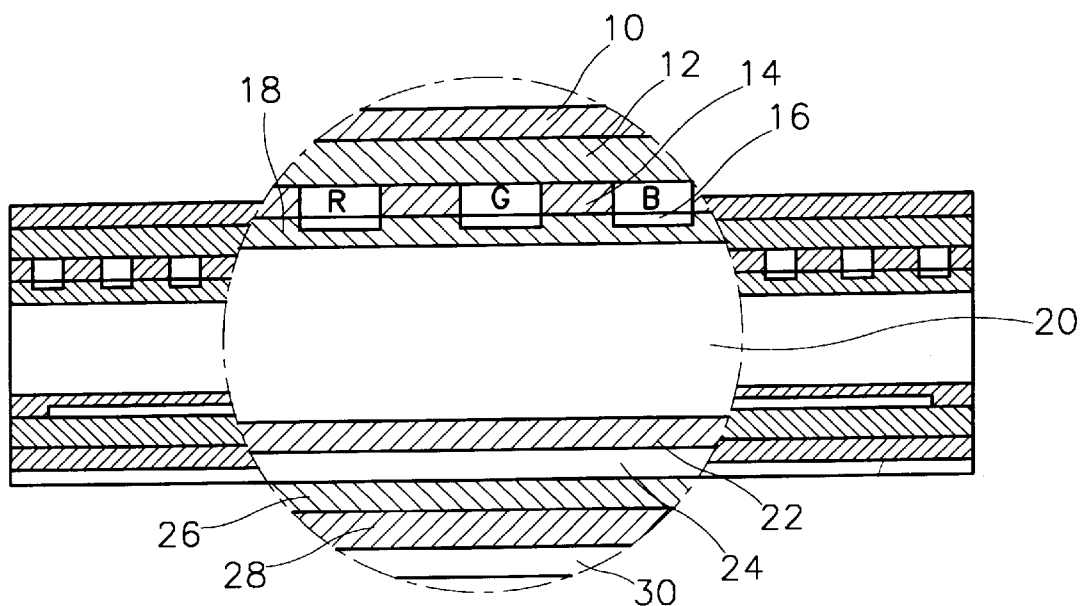
FIG. 1 is a sectional view illustrating a conventional reflection type color LCD device.
Figure 2:
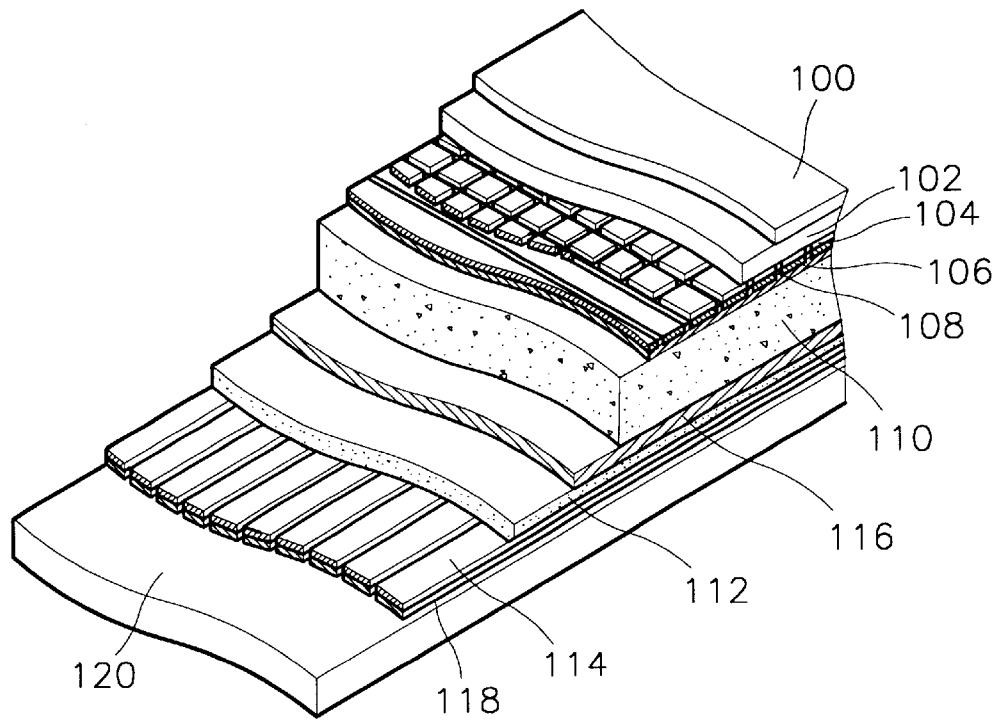
FIG. 2 is a perspective view illustrating a reflection type color LCD device according to a first preferred embodiment of the present invention.

Referring to FIG. 2, the reflection type LCD device according to a preferred embodiment of the present invention is comprised of an upper substrate 102 and a lower substrate 120 arranged to be displaced from one another. A color filter 104 is formed below the upper substrate 102. An upper electrode 106 is formed in strips below the color filter 104 and a lower electrode 118 is formed in strips on the lower substrate 120. The upper and lower electrodes 106 and 118 are perpendicular each other. Also, upper and lower orientation films 108 and 116 are formed below the upper electrode 106 and above the lower electrode 118, respectively. Between the lower orientation film 116 and the lower electrode 118, a reflection layer 114 and a hologram layer 112 are formed in sequence. A liquid crystal layer 110 is formed between the upper and lower orientation films 108 and 116.

The hologram layer 112 is characterized in that efficiency of use of light passing through the hologram layer improves with respect to light of a particular wavelength. The hologram layer 104 is formed into a predetermined pattern to correspond to red, green and blue pixels of the color filter 112 so that light of a different wavelength is allowed to pass therethrough according to the pattern of the hologram layer 112. If the hologram layer 112 can maximize efficiency in transmission of light of a particular wavelength, and totally cut off light of the different wavelength, the use of the color filter 104 can be avoided. A method for forming the hologram layer 112 into a predetermined pattern will be described later.

The reflection layer 114 is preferably formed of aluminum. Also, it is preferable that the reflection layer 114 is formed in strips similar to the shape of the electrode and is arrayed corresponding to the lower electrode 118. Furthermore, a polarizer 100 is provided on the upper substrate 102. However, when the liquid crystal layer 110 is dyed with a particular color, there is no need to use the polarizer 100. A method of dying is well known in the relevant field.

The operation of the reflection type LCD device structured as above according to a first embodiment of the present invention will now be described.

When power is applied to the upper and lower electrodes 106 and 118, the liquid crystal layer 110 selectively allows light to pass therethrough and then the light passes through the polarizer 100, the upper substrate 102, the color filter 104, the upper electrode 106, the upper orientation film 108, the liquid crystal layer 110, the lower orientation film 116, and the hologram layer 112, in sequence, and finally arrives at the reflection layer 114. The inputted light is then reflected from the reflection layer 114 and proceeds out of the LCD device following the reverse order of the inputted light. Here, as the light passes through the hologram layer 112 during input and output of light, efficiency of light use increases and thus an image of improved brightness can be provided.

Figure 3:
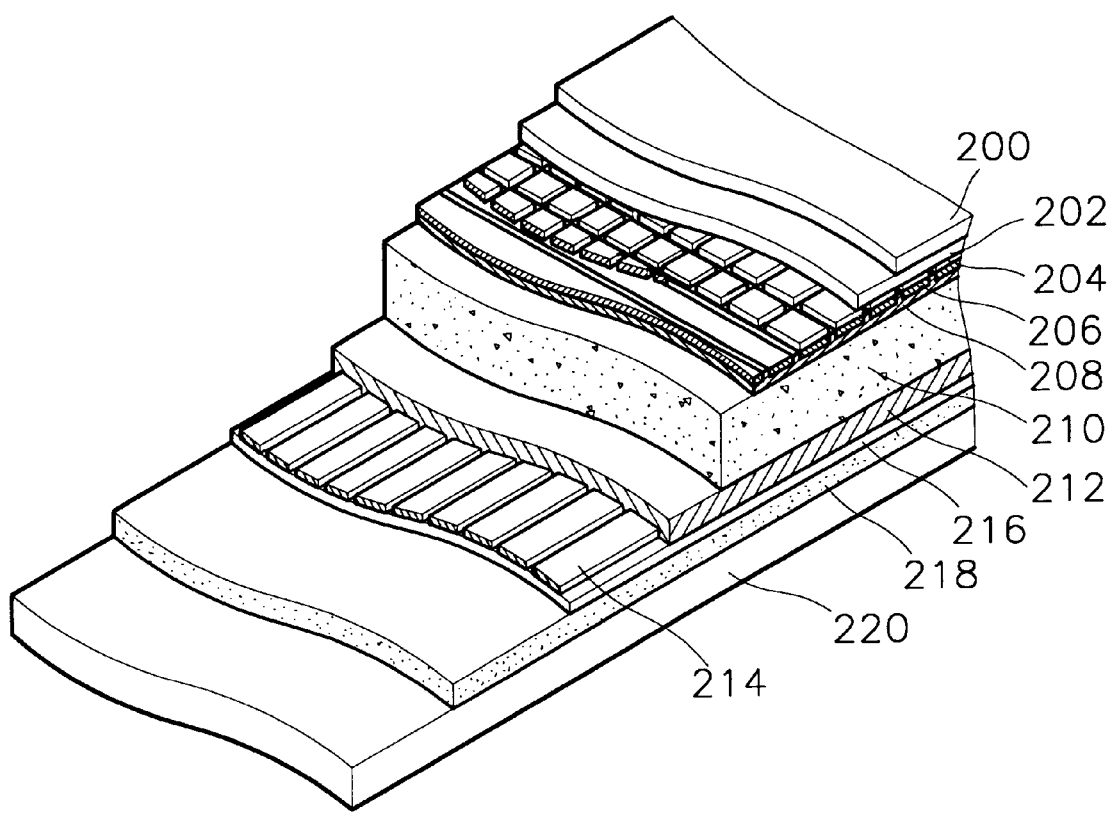
FIG. 3 is a perspective view illustrating a reflection type color LCD device according to a second preferred embodiment of the present invention.

FIG. 3 shows a reflection type color LCD device according to a second preferred embodiment of the present invention.

Referring to the drawing, the LCD device includes a lower substrate 216 and an upper substrate 202, and a lower electrode 214, a lower orientation film 212, a liquid crystal layer 210, an upper orientation film 208, an upper electrode 206 and a color filter layer 204 are sequentially formed therebetween. Also, a polarizer 200 is disposed on the upper substrate 202. A hologram layer 218 is formed below the lower substrate 216 and a reflection layer 220 is formed below the hologram layer 218. That is, as shown in the drawing, when the reflection layer 220 is formed below the lower substrate 216, the hologram layer is formed on the reflection layer 220. Of course, the hologram layer 218 has predetermined patterns and can increase the efficiency of light use by patterns with respect to light of a different wavelength. Light inputted to the LCD device arrives at the reflection layer 220 by a selective penetration operation of the liquid crystal layer 210. The light arrived at the reflective layer 220 is reflected out of the LCD device to display a predetermined image. As the light passes through the hologram layer 218 during input and output of light, the efficiency of light use increases.

Figure 4:
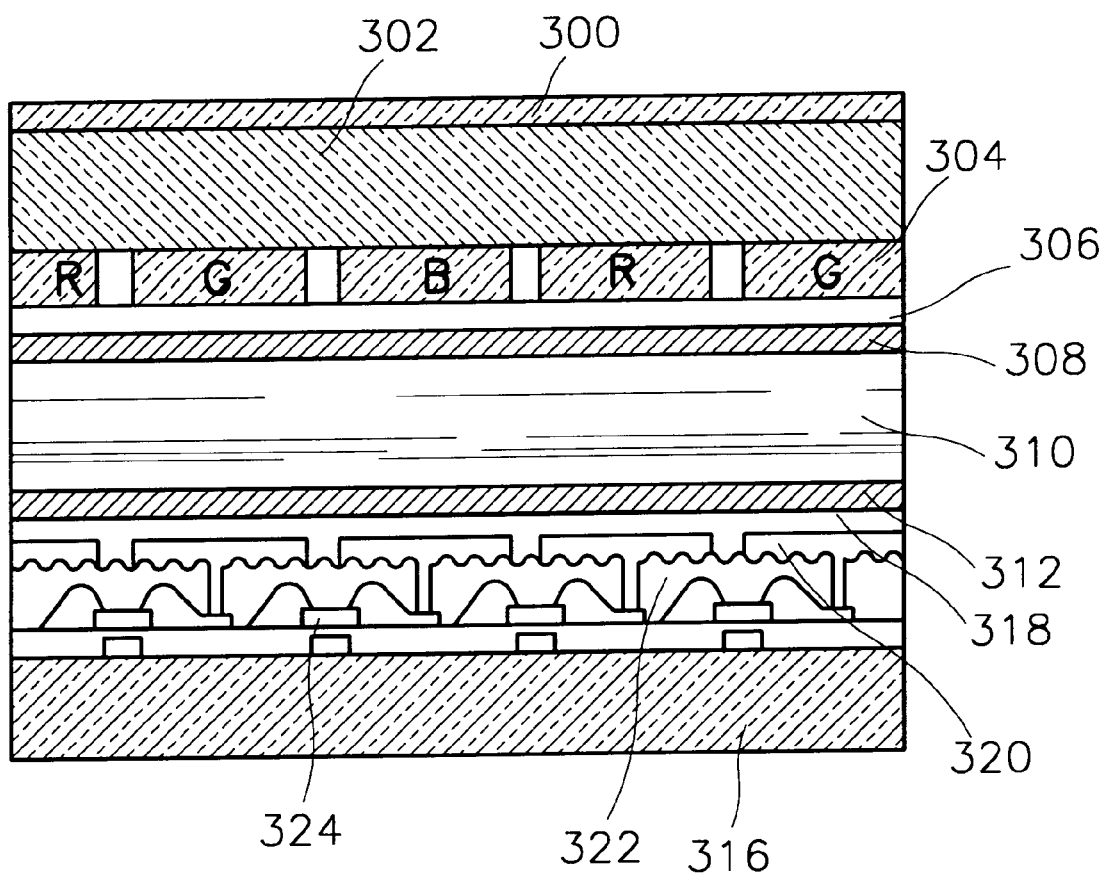
FIG. 4 is a sectional view illustrating a reflection type color LCD device according to a third preferred embodiment of the present invention.

FIG. 4 is a sectional view of an LCD device according to a third preferred embodiment of the present invention.

Referring to the drawing, the LCD device according to the third embodiment is an active matrix type LCD device which adopts a thin film transistor (TFT) device. This LCD device includes an upper substrate 302 and a lower substrate 316, and therebetween, a TFT device 324, an insulation layer 322, a reflection layer 320, a hologram layer 318, a lower orientation film 312, a liquid crystal layer 310, an upper orientation film 308, an electrode 306, and a color filter 304 are sequentially formed. A polarizer 300 is arranged on the upper substrate 302. The hologram layer 318 formed between the reflection layer 320 and the lower orientation film 312 is patterned to correspond to that of the color filter 304. Preferably, the material of the reflection layer 320 is aluminum. As described above, the hologram layer 318 increases the efficiency of use of the light reflected by the LCD device and accordingly, brightness of an image can be improved.

As described above, the hologram layer can increase the efficiency of use of the light of a particular wavelength. In the case of a full color reflection type color LCD device, when a hologram layer for increasing the efficiency of light use with respect to a single particular wavelength is used, the effect of the increased light use efficiency is limited to any one pixel of red, green and blue pixels, with affecting the other pixels. That is, the effect is selectively made to only a single wavelength, not increasing the light use efficiency of all the red, green and blue wavelengths which were selectively allowed to be penetrated by the color filter.

To compensate for the above defect, the employed hologram layer is patterned. That is, the hologram layer is patterned to selectively produce an effect on the red, green and blue pixels. The patterns of the hologram layer are arrayed to respectively correspond to red, green and blue patterns of the color filter. Accordingly, the hologram pattern to increase the efficiency of light use at the red wavelength corresponds to the red pixel, and the same applies for the green and blue pixels.

FIGS. 5A through 5D show a method for forming the hologram layer. The method can be applied in forming the holographic device of the LCD device shown in FIG. 3.

Figure 5A:
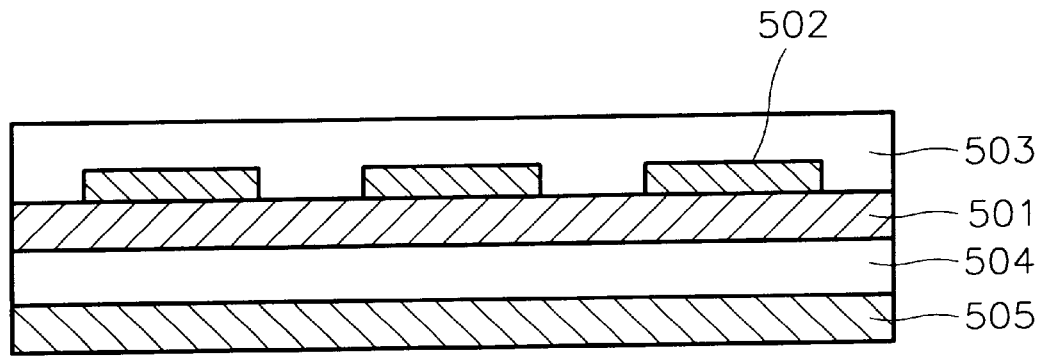
FIGS. 5A and 5D are sectional views for showing a method of forming the hologram layer of the present invention.

Referring to FIG. 5A, a transparent electrode 502 in strips and an orientation film 503 are formed on one surface of a substrate 501 in a previous step, and a light-curable resin layer 504 and a reflection layer 505 are sequentially deposited on the other surface thereof. The light-curable resin layer 504 is a layer to be formed into a hologram layer in a step which will be described later, e.g., a photopolymer layer including vinyl monomer.

Figure 5B:
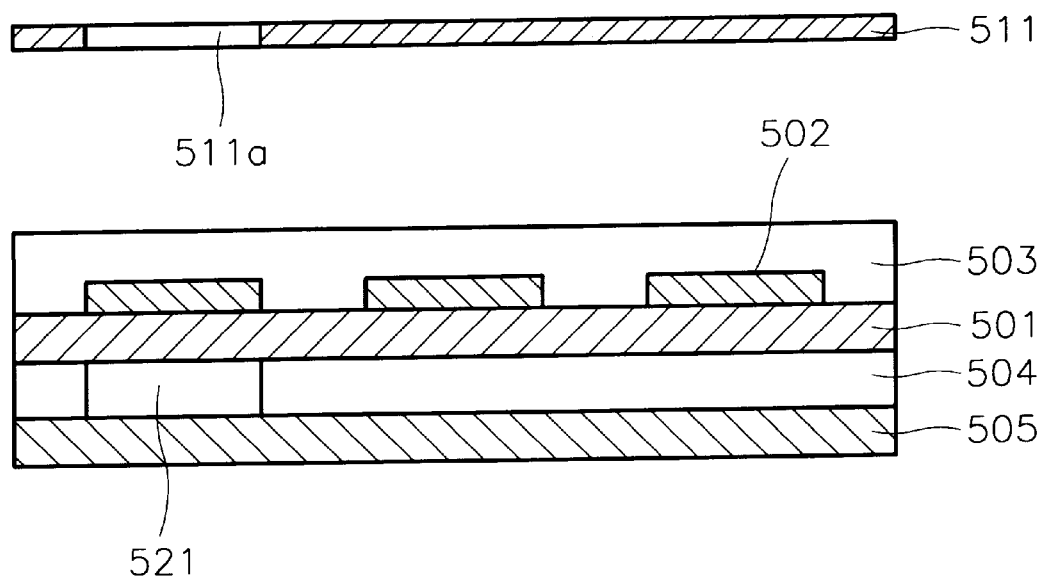

Referring to FIG. 5B, the light-curable resin layer 504 of the substrate 501 covered by a first mask 511 is exposed to a laser beam of a particular wavelength. The first mask 511 coincides with one of red, green and blue patterns formed on the color filter of the LCD device. For instance, a pattern of an aperture 511a in the mask 511 is formed to be the same as that of the red pixel of the color filter, and a laser beam of a 633 nm wavelength corresponding to red color is radiated therethrough. Since a portion of the light-curable resin layer 504 is light-cured by the radiation of the laser beam, a first hologram portion 521 is formed. The first hologram portion 521 improves efficiency of use of the light having a wavelength for red.

Figure 5C:
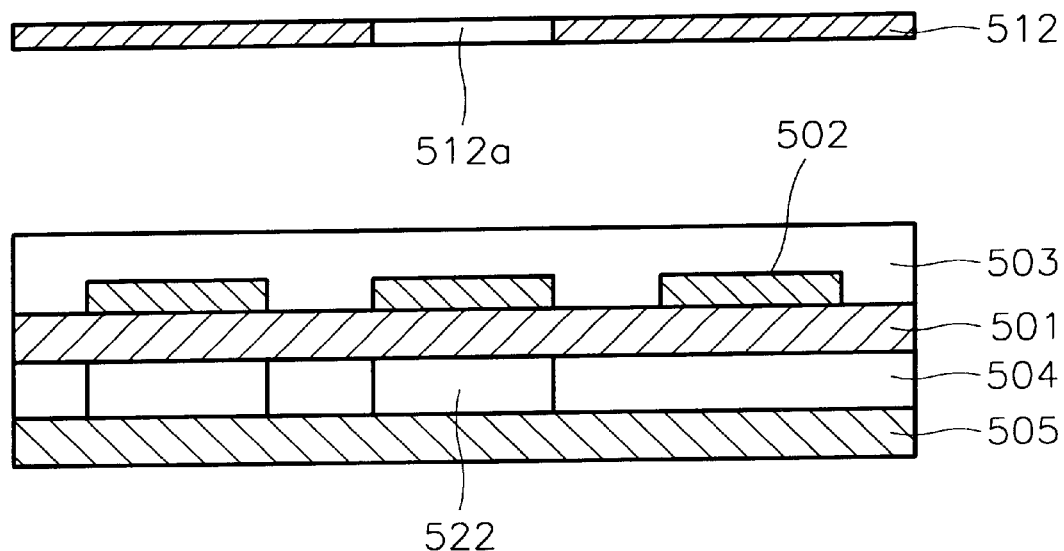

Referring to FIG. 5C, the light-curable resin layer 504 of the substrate 501 covered by a second mask 512 is exposed to a laser beam of a different wavelength. For instance, an aperture 512a is formed in the second mask 512 to be the same as the pattern of the green pixel of the color filter, and the second mask 512 is exposed to a laser beam of a 524 nm wavelength corresponding to green color. Thus, a second hologram portion 522 is formed in the light-curable resin layer 504. The second hologram portion 522 improves efficiency of use of the light having a wavelength for green.

Figure 5D:
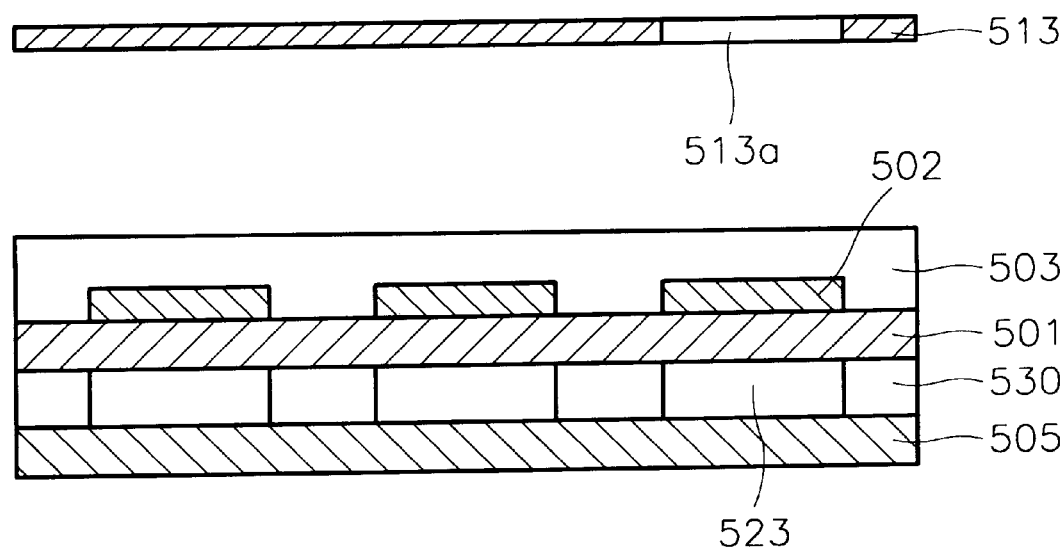

In FIG. 5D, the light-curable resin layer 504 of the substrate 501 covered by a third mask 513 is exposed to a laser beam of a different wavelength. For instance, an aperture 513a is formed in the third mask 513 to be the same as the pattern of the blue pixel of the color filter, and the third mask 513 is exposed to a laser beam of a 442 nm wavelength corresponding to blue color. Thus, a third hologram portion 523 is formed in the light-curable resin layer 504. The third hologram portion 523 improves efficiency of use of the light having a wavelength for blue.

The hologram layer having a predetermined pattern can also be formed by using a light-etching method, not using the masking method described above. According to the light-etching method, the light-curable resin layer formed on the substrate is cured by radiating a laser beam of a 633 nm wavelength corresponding to red color. Next, except for a portion corresponding to the red pixel pattern of the color filter, the entire portion of the light-curable resin layer is etched to form a hologram portion for red color. A light-curable resin layer is then coated on the entire surface of the substrate and a laser beam of a 524 nm wavelength of green color is radiated thereon. A portion of the cured light-curable resin layer corresponding to the green pixel pattern of the color filter is selectively etched. Thus, a hologram portion for green color is formed further to the hologram portion for red color. The same process is applied for forming a hologram portion for blue color using a laser beam of a 442 nm wavelength. Therefore, a hologram layer having hologram portions in coincidence with the pattern of the color filter is formed.

As described above, in the LCD device according to the present invention, since the hologram layer which can maximize efficiency of light use according to each wavelength of red, green and blue colors of the color filter is formed above the reflection layer, efficiency of reflection of light reflected from the reflection layer can be improved and the quality of an image can be improved by increasing brightness of the image.

It is noted that the present invention is not limited to the preferred embodiment described above, and it is apparent that variations and modifications by those skilled in the art can be effected within the spirit and scope of the present invention defined in the appended claims.

What is claimed is:

1. An LCD device comprising:
   a first substrate and a second substrate disposed from each other with a predetermined distance;
   a liquid crystal layer between said first and second substrates;
   a color filter disposed on a surface of said second substrate;
   a reflection layer disposed on an outer surface of said first substrate to reflect light entering from said second substrate through said liquid crystal layer, back toward said second substrate; and
   a hologram layer having a plurality of patterns which are different from each other, wherein each pattern corresponds to a different one of colors in said color filter.

2. The LCD device as claimed in claim 1, further comprising a polarizer disposed on one side of one of said substrates to control light inputted to said liquid crystal layer.

3. An LCD device comprising:
   a first substrate and a second substrate disposed from each other with a predetermined distance;
   a pattern of electrodes formed on inner surfaces of said substrates;
   an orientation film formed over said pattern of electrodes;
   a liquid crystal layer between said first and second substrates;
   a reflection layer disposed on a surface of said first substrate to reflect light entering from said second substrate through said liquid crystal layer, back toward said second substrate; and
   a hologram layer formed between said first substrate and said second substrate.

4. An LCD device as claimed in claim 3, wherein said hologram layer has the same pattern as said pattern of electrodes.

5. An LCD device as claimed in claim 3, wherein said hologram layer is formed between said pattern of electrodes and said orientation film.

6. An LCD device comprising:
   a first substrate and a second substrate disposed from each other with a predetermined distance;
   a pattern of electrodes or thin film transistor driving device formed on one of the surfaces of said substrates facing each other;
   an orientation film formed over said pattern of electrodes or thin film transistor driving device;
   a liquid crystal layer between said first and second substrates;
   a reflection layer disposed on the outer surface of said first substrate to reflect light, which is entered from said second substrate through said liquid crystal layer, back toward said second substrate;
   a hologram layer having predetermined patterns and light transmissivity which differs according to each of the patterns so that efficiency of use of the light reflected by said reflection layer can be maximized, wherein said hologram layer is formed on one of said substrates and said reflection layer is deposited thereon.

* * * * *